US012709546B2

(12) United States Patent
Althoff et al.

(10) Patent No.: US 12,709,546 B2
(45) Date of Patent: Aug. 18, 2026

(54) METHOD FOR PRODUCING SULPHUR-CONTAINING POTASH GRANULES

(71) Applicant: K+S AKTIENGESELLSCHAFT, Kassel (DE)

(72) Inventors: Stefan Althoff, Datteln (DE); Guido Baucke, Schenklengsfeld (DE); Andreas Bleckmann, Heringen/Wölfershausen (DE); Armin Dietrich, Weißenborn (DE); Stefan Dressel, Kassel (DE); Ludger Waldmann, Telgte (DE)

(73) Assignee: K+S AKTIENGESELLSCHAFT, Kassel (DE)

( * ) Notice: Subject to any disclaimer, the term of this patent is extended or adjusted under 35 U.S.C. 154(b) by 1011 days.

(21) Appl. No.: 17/772,719

(22) PCT Filed: Oct. 28, 2020

(86) PCT No.: PCT/DE2020/000260
§ 371 (c)(1),
(2) Date: Apr. 28, 2022

(87) PCT Pub. No.: WO2021/083444
PCT Pub. Date: May 6, 2021

(65) Prior Publication Data

US 2022/0402766 A1 Dec. 22, 2022

(30) Foreign Application Priority Data

Oct. 31, 2019 (DE) .................... 10 2019 007 587.0

(51) Int. Cl.

| | |
|---|---|
| ***C01D 3/22*** | (2006.01) |
| ***C01D 3/26*** | (2006.01) |
| ***C01F 5/40*** | (2006.01) |
| *C05D 1/02* | (2006.01) |
| *C05D 5/00* | (2006.01) |
| *C05D 9/02* | (2006.01) |

(52) U.S. Cl.
CPC ................ *C01D 3/22* (2013.01); *C01D 3/26* (2013.01); *C01F 5/40* (2013.01); *C01P 2004/52* (2013.01); *C05D 1/02* (2013.01); *C05D 5/00* (2013.01); *C05D 9/02* (2013.01)

(58) Field of Classification Search
CPC ............... C01D 3/22; C01D 3/26; C01F 5/40
See application file for complete search history.

(56) References Cited

U.S. PATENT DOCUMENTS

| | | | | |
|---|---|---|---|---|
| 6,544,313 B2 * | 4/2003 | Peacock | C05D 9/00 71/36 |
| 7,727,501 B2 * | 6/2010 | Ferguson | C01D 3/22 264/210.1 |
| 2014/0260467 A1 * | 9/2014 | Peacock | C05G 5/12 71/48 |
| 2020/0017362 A1 | 1/2020 | Baucke et al. | |

FOREIGN PATENT DOCUMENTS

| | | | |
|---|---|---|---|
| AU | 2013231024 | A1 | 4/2014 |
| CN | 108137429 | A | 6/2018 |
| DE | 102017010084 | A1 | 5/2019 |
| EP | 0719748 | A2 | 7/1996 |
| WO | 2001087803 | A1 | 11/2001 |
| WO | 2010058038 | A1 | 5/2010 |
| WO | 2013019935 | A2 | 2/2013 |
| WO | 2014009326 | A1 | 1/2014 |
| WO | 2016183685 | A1 | 11/2016 |
| WO | 2017027785 | A1 | 2/2017 |
| WO | 2018041285 | A1 | 3/2018 |
| WO | 2018156956 | A1 | 8/2018 |

OTHER PUBLICATIONS

Patent Cooperation Treaty, International Search Report and Written Opinion, English Translation, for PCT/DE2020/000260, 9 pages, dated Feb. 26, 2021.

* cited by examiner

*Primary Examiner* — Wayne A Langel
(74) *Attorney, Agent, or Firm* — Viksnins Harris Padys Malen LLP

(57) ABSTRACT

The invention relates to a method for producing sulphur-containing potash granules from fine-particle, potassium-chloride-containing raw materials and elementary sulphur, and to the sulphur-containing potash granules obtained with this method. The method comprises the following steps a) and b): a) mixing a potassium-chloride-containing, fine-particle raw material with a sulphur melt in a quantity of 2 to 30 wt. %, in particular 3 to 25 wt. %, preferably 5 to 23 wt. % and particularly preferably 8 to 20 wt. % in relation to the total amount of sulphur melt and fine-particle raw material, producing a mixture of fine-particle raw material and molten sulphur; and b) compacting the mixture of fine-particle raw material and molten sulphur obtained in step a). The invention also relates to the use of sulphur melts in the production of potassium chloride granules by compacting a potassium-chloride-containing, fine-particle raw material to reduce the pressing force during compacting, and to the use of sulphur melts to improve the mechanical strength of potash granules, containing potassium chloride, in particular potash granules obtained by compacting a sulphur- and potassium-chloride-containing, fine-particle raw material.

20 Claims, No Drawings

METHOD FOR PRODUCING SULPHUR-CONTAINING POTASH GRANULES

CROSS-REFERENCE TO RELATED APPLICATION(S)

This application claims the benefit of priority of DE Application No. 10 2019 007 587.0 filed Oct. 31, 2019.

The present invention relates to a process for producing sulfur-containing potash granules from finely divided, potassium chloride-containing raw materials and elemental sulfur and the sulfur-containing potash granules obtainable by this process.

Potassium chloride is an important constituent of agricultural fertilizers. Potassium chloride is usually obtained in underground mines by conventional mining, by solution mining or by solar evaporation of salt water. The potassium chloride obtained in this way is then processed further to give the desired use forms.

Potassium chloride is frequently marketed in the form of granules since these have advantageous handling properties. Thus, granules tend to form very little dust in contrast to finely divided crystalline potassium chloride, are more stable on storage, have less tendency to cake and, when used as fertilizer, can be spread more easily and more uniformly by scattering. The quality of the potash granules and thus the market price which can be achieved depend both on the purity and on the granule quality.

The crystalline potassium chloride raw material obtained in the mining of potassium chloride usually has particle sizes which are significantly below the desired granule size. To produce the granules, the potassium chloride raw materials are subjected to a conventional granulation process in which the finely divided crystalline potassium chloride particles of the raw material are brought together (agglomerated), resulting in an increase in grain size.

Customary granulation methods for producing potash granules are compaction processes and buildup agglomeration processes. In the buildup agglomeration of potassium chloride, the finely divided starting material is intensively agitated with addition of an aqueous liquid and optionally binders, so that numerous impacts between the primary particles occur so that the latter then become attached to one another in the form of aggregates due to the capillary forces generated by the liquid. These aggregates can then become joined to one another or to further primary particles. The continual agitation leads to progressive buildup of particle layers and to compaction of the particles, so that moist granules (green granules) of the desired size are obtained at the end and these are then dried and hardened to give the finished granules. In the compaction processes, the finely divided, potassium chloride-containing starting material is compacted by application of pressure, so that sometimes very high forces act on the particles of the starting material. This results in deformation of the primary particles in the contact region, for example by plastic deformation, which considerably increases the adhesion of the primary particles to one another. Solid-state bridges can also be formed between the primary particles as a result of frictional heat. In a customary compaction method, the finely divided starting material is pressed by means of two contrarotating rollers to give a strand, known as the ribbon, which is communited to form the actual granules which are then usually classified. In another variant of the compaction processes, the finely divided starting material is pressed/briquetted by means of shaping rollers to give shaped bodies which have the desired granule size. This is generally followed by a rounding process.

The potash granule particles are damaged by action of mechanical forces as occur during handling, during storage or in particular even during transport. This leads firstly to a decrease in the particle diameter of the granule particles and an accompanying decrease in value and secondly to not inconsiderable formation of finely divided particles. These finely divided particles can lead to problems in the storage and handling of the granules because, for example, they form dust or result in caking of the granule particles in the presence of moisture.

To improve the mechanical stability of the granules, binders which improve the adhesion forces between the particles of the finely divided starting material and thus cohesion of the particles in the granules are sometimes used in the abovementioned granulation processes, in particular in buildup agglomeration. Typical binders are, for example, gelatin, starch, molasses, lignosulfonates, hydrated lime and clay minerals or else particular phosphates. The choice of the binder will generally have a critical influence on the properties of the granules, in particular their mechanical strength (abrasion, hardness), their hygroscopic properties and their tendency to form dust. However, potash granules usually have only an unsatisfactory mechanical stability even when using such, conventional binders, so that the abovementioned problems occur.

Furthermore, it is known that sulfur is an important secondary plant nutrient. In general, sulfur is used together with a primary plant fertilizer such as phosphate fertilizer, nitrate fertilizer, urea fertilizer or potash fertilizer. For this purpose, the sulfur can be used in the form of sulfates or in elemental form. Elemental sulfur is frequently used as a blend with primary fertilizers. However, this incurs the risk of demixing and inaccurate metering resulting therefrom.

A variety of fertilizer granules containing elemental sulfur have been described. Thus, WO 2001/087803 describes a process for producing sulfur-containing fertilizer granules, in which fertilizer particles are firstly sprayed with molten sulfur and subsequently sprayed with an aqueous slurry of the fertilizer and the resulting particles are allowed to harden. The production of phosphate-containing fertilizer granules is the main focus here. This process, which is based on the principle of buildup agglomeration, is comparatively complicated and does not lead to uniform distribution of the sulfur in the granulated material.

WO 2010/058083 describes a process for producing sulfur-containing fertilizer, in which a suspension of sulfur in a liquid, in particular in an aqueous mineral acid such as phosphoric acid or sulfuric acid, is firstly produced by wet milling the sulfur in a rotor-stator mill, this suspension is mixed with fertilizer constituents and the mixture is granulated. The process is suitable first and foremost for producing superphosphate fertilizer granules. The process is comparatively complicated since a suspension of the sulfur firstly has to be produced by an energy-intensive wet milling process. In addition, the granules have to be dried after they have been produced, which increases the energy consumption for the production thereof further.

WO 2014/009326 describes a process similar to that of WO 2010/058083, in which a first stream of a liquid fertilizer or fertilizer precursor is emulsified in a mixing apparatus with a second stream of molten sulfur in a polyfunctional anionic surface-active substance such as lignosulfonate and the emulsion obtained is subsequently processed to give fertilizer granules. Molten urea and phosphoric acid, in particular, are proposed as liquid fertilizer.

The process is comparatively complicated and restricted to the production of fertilizer granules which have a liquid primary fertilizer constituent.

WO 2013/019935 describes the production of potassium chloride fertilizer granules containing micronutrients. Micronutrients mentioned are, inter alia, sulfur and mixtures of other micronutrients such as boron compounds, copper salts, molybdenum salts, zinc salts, manganese salts and iron salts. Production is carried out by mixing of finely divided potassium chloride with the micronutrients and compaction of the mixture of potassium chloride and micronutrients and communition of the compacted material obtained to give granules.

WO 2016/183685 describes a process similar to that of WO 2013/019935 for producing sulfur-containing fertilizer granules, in which micronized sulfur is mixed with a fertilizer powder and this mixture is compacted. To avoid explosion risks, the micronized sulfur is preferably used in moist form.

The processes of the prior art are associated with a number of disadvantages. Thus, the sulfur either has to be emulsified or suspended by wet milling or micronized dry before mixing with the primary fertilizer constituents. Both measures are complicated and energy-intensive. If the micronized sulfur is not provided in the form of an aqueous suspension or emulsion, there is also a not inconsiderable risk of explosion, so that complicated safety measures have to be undertaken. In the case of potash granules, the yield of granulated material is comparatively low when using micronized sulfur. In addition, sulfur-containing potash granules which have been produced by these processes often no longer have a satisfactory strength after moist weathering.

It is therefore an object of the present invention to provide a process for producing sulfur-containing potash granules which is simple to carry out and gives high-quality granules having a high fracture or rupture strength and low abrasion having good strengths even after moist weathering.

It has surprisingly been found that potash granules can be produced in a simple way by mixing a potassium chloride-containing, finely divided raw material with a sulfur melt in an amount of from 2 to 30% by weight, based on the total amount of sulfur melt and potassium chloride-containing raw material, and subjecting the resulting mixture of finely divided raw material and molten sulfur to compaction.

The invention accordingly provides a process for producing sulfur-containing potash granules, comprising the following steps a) and b):

a) mixing of a potassium chloride-containing, finely divided raw material with a sulfur melt in an amount of from 2 to 30% by weight, in particular from 3 to 25% by weight, preferably from 5 to 23% by weight and especially from 8 to 20% by weight, based on the total amount of sulfur melt and finely divided raw material, to give a mixture of finely divided raw material and molten sulfur and b) compaction of the mixture of finely divided raw material and molten sulfur obtained in step a).

The process of the invention is associated with a series of advantages. Firstly, the process can be carried out in a simpler way than the processes of the prior art since prior micronization or emulsification is not necessary. In addition, the process gives the sulfur-containing potash granules in good yields which are higher than the yields obtained when using micronized sulfur. In contrast to the use of aqueous sulfur emulsions, it is no longer necessary to remove water.

This process has the further advantage that the pressing force necessary in the compaction of the finely divided raw materials and usually required in order to obtain stable granules is decreased by the sulfur melt, both compared to potassium chloride-containing finely divided raw materials which do not contain any elemental sulfur and compared to potassium chloride-containing finely divided raw materials which contain milled sulfur.

The invention therefore also provides for the use of sulfur melts in the production of potassium chloride granules by compaction of a potassium chloride-containing, finely divided raw material in order to reduce the pressing force during compaction.

In addition, the sulfur-containing potash granules obtainable by the process of the invention have good fracture strengths and display low abrasion. The use of conventional binders is not necessary to achieve this. In particular, the sulfur-containing potash granules obtainable by the process of the invention have a satisfactory strength even after moist weathering which is higher than when using micronized sulfur. In the sulfur-containing potash granules obtainable by the process of the invention, the elemental sulfur is also in very finely divided form. Thus, the particle size distribution of the particles of the elemental sulfur present in the granules typically has D90 values below 250 μm, in particular not more than 200 μm, determined by laser light scattering. The laser light scattering can, for example, be carried out by the method given in ISO 13320:2009.

The invention therefore also provides the potash granules obtainable by the process of the invention. The invention also provides for the use of sulfur melts for improving the mechanical strength of potash granules containing potassium chloride, in particular of potash granules which are obtained by compaction of a finely divided raw material containing sulfur and potassium chloride.

Here and in the following, dry constituents are those constituents of a sample which remain in the sample after defined drying to constant weight by a method based on DIN EN 12880:2000 at temperatures in the range from 105±5° C. at ambient pressure and are referred to as dry residue. The mass of the dry residue is accordingly the mass of the sample minus the loss of drying. For this purpose, a sample will typically be dried in a drying oven under the conditions indicated here. The time necessary to achieve the constant weight is typically less than 2 hours. The dry residue in %, based on the initial weight used, is determined by weighing before and after drying. The loss on drying in % is obtained from the dry residue in % by subtraction from 100.

The particle sizes indicated below for the raw material and the granules are typically determined by sieve analysis in accordance with DIN 6165:2016-08. The determination of the proportions by mass of the respective particle sizes and particle size ranges is carried out according to DIN 66165:2016-08 by fractionation of the disperse material using a plurality of sieves by means of mechanical sieving in precalibrated systems. All percentages reported in respect of the particle or grain size are % by weight. In the case of the finely divided raw material, the particle size distribution can also be determined by laser light scattering, for example using the method indicated in ISO 13320:2009, especially in the case of very small particles having particle sizes of <500 μm.

In step a), a sulfur melt is provided and mixed with a potassium chloride-containing, finely divided raw material.

A person skilled in the art will understand from the term "finely divided" that the raw material is present in the form of finely divided particles, e.g. in the form of a dust or a powder. Typically, at least 90% by weight, in particular at least 95% by weight, of the particles of the finely divided, potassium chloride-containing raw material have a particle size of not more than 2000 μm, in particular not more than 1500 μm and especially not more than 1000 μm, determined by sieve analysis in accordance with DIN 6165:2016-08. In particular, at least 90% by weight, especially at least 95% by weight, of the particles of the finely divided, potassium chloride-containing raw material have a particle size in the range from 0.01 to 2 mm, in particular in the range from 20 to 1500 μm or in the range from 25 to 1000 μm, determined by sieve analysis in accordance with DIN 6165:2016-08.

According to the invention, the finely divided raw material contains potassium chloride. The potassium chloride is usually fine salt, i.e. a crystalline potassium chloride which has been mechanically mined or obtained by solar evaporation or solution mining and has been treated, for example, by floating, evaporation, crystallization and/or by a hot dissolution process or by a combination of these measures. Such a potassium chloride generally has a potassium content of less than 55% by weight, based on the dry constituents and calculated as $K_2O$. Depending on the origin, the potassium chloride contains the typical impurities, in particular sodium salts and alkaline earth metal salts, especially magnesium salts and/or calcium salts. The potassium chloride raw material used frequently contains alkaline earth metal salts, e.g. calcium and/or magnesium salts, in a total amount of from 0.01 to 2.0% by weight, in particular from 0.05 to 1% by weight, in each case calculated as alkaline earth metal chloride, e.g. as $MgCl_2$ or $CaCl_2$, and based on the potassium chloride (KCl) present in the raw material. Instead of a freshly treated fine salt, it is also possible to use a previously manufactured fine salt as potassium chloride, for example a manufactured fine salt having a potassium content of at least 55% by weight, based on the dry constituents and calculated as $K_2O$.

The proportion of potassium chloride in the raw material is generally at least 50% by weight, frequently at least 55% by weight, in particular at least 60% by weight and especially at least 65% by weight or at least 70% by weight. The proportion of potassium chloride in the finely divided raw material can be up to 100% by weight and, owing to the impurities usually present in the potassium chloride, is generally not more than 99.5% by weight, in particular not more than 99% by weight, based on the dry mass of the finely divided raw material. Accordingly, the finely divided raw material generally has a potassium content, calculated as $K_2O$, of at least 31.5% by weight, frequently at least 34.5% by weight, in particular at least 37.5% by weight and especially at least 41% by weight or at least 44% by weight, based on the mass of the dry constituents of the raw material. Its potassium content, calculated as $K_2O$, will typically not exceed 63% by weight, in particular 62.7% by weight and especially 62.3% by weight, based on the mass of the dry constituents of the raw material.

The potassium chloride used for producing the finely divided potassium chloride-containing raw material typically has a particle size range in which at least 90% by weight, especially at least 95% by weight, of the particles of the potassium chloride have a particle size in the range from 0.01 to 2 mm, in particular in the range from 20 to 1500 μm or in the range from 25 to 1000 μm.

The potassium chloride can be the sole constituent of the finely divided raw material. However, the finely divided raw material can also contain up to 50% by weight, frequently not more than 45% by weight, in particular not more than 40% by weight and especially not more than 35% by weight or not more than 30% by weight, based on the dry mass of the finely divided raw material, of one or more inorganic compounds which are different from potassium chloride in addition to the potassium chloride.

These inorganic compounds which are different from potassium chloride are typically compounds which can customarily be present in fertilizer granules based on potassium chloride. They include, in particular, salts of secondary nutrients and also micronutrients or inorganic, in particular salt-like, compounds containing micronutrients. Preferred salts of secondary nutrients are, in particular, sulfates such as magnesium sulfate, including the hydrates thereof, and further salts. The micronutrients or the inorganic compounds of micronutrients include salt-like boron compounds and also salts and complexes of the elements manganese, zinc, copper, iron and molybdenum. Manganese, copper, iron and zinc can, for example, be used in the form of their sulfates, oxides or chlorides. Copper and iron are preferably also used in the form of chelates, e.g. with EDTA. Boron is preferably used as calcium sodium borate, e.g. in the form of ulexite, as calcium borate, e.g. in the form of colemanite, as sodium borate, e.g. as sodium tetraborate, as potassium borate or as boric acid. Molybdenum is preferably used as sodium or ammonium molybdate or as a mixture thereof. The proportion of salts of secondary nutrients, in particular magnesium sulfate, including the hydrates thereof, insofar as they are present in the raw material, is typically in the range from 1 to 40% by weight, in particular in the range of 2 to 30% by weight, especially in the range from 5 to 25% by weight, based on the dry mass of the finely divided raw material. The proportion of inorganic compounds of micronutrients is, insofar as they are present in the raw material, typically in the range from 0.1 to 10% by weight, in particular in the range from 0.2 to 8% by weight and especially in the range from 0.5 to 6% by weight, based on the dry mass of the finely divided raw material. The inorganic compounds which are different from potassium chloride also include sodium chloride and other sodium salts which may be present in fertilizers. If present in the finely divided raw material, the amount of sodium chloride is preferably not more than 20% by weight, based on the dry mass of the finely divided raw material.

The further inorganic compounds used for producing the finely divided potassium chloride-containing raw material typically have a particle size range in which at least 90% by weight, especially at least 95% by weight, of the particles of the further inorganic material have a particle size in the range from 0.01 to 2 mm, in particular in the range from 20 to 1500 μm or in the range from 25 to 1000 μm.

In a preferred embodiment of the invention, potassium chloride is the sole constituent of the finely divided raw material. Accordingly, the raw material has a potassium content, calculated as $K_2O$, of at least 55% by weight, based on the mass of the dry constituents of the raw material. In this embodiment and the following embodiments, the potassium chloride can of course contain the impurities typical according to the origin.

In a further embodiment of the invention, the finely divided raw material contains at least one further inorganic salt in addition to potassium chloride. This further inorganic salt is, in particular, selected from among the abovementioned salts of secondary nutrients and the inorganic, in particular salt-like, compounds of micronutrients.

In this embodiment of the invention, the raw material typically contains a) from 55 to 99.9% by weight, in particular from 60 to 99.8% by weight, especially from 65 to 99.5% by weight, of potassium chloride,
b) from 0.1 to 50% by weight, in particular from 0.2 to 40% by weight and especially from 0.5 to 30% by weight, of at least one further inorganic compound which is, in particular, selected from among salts of secondary nutrients, inorganic compounds containing one or more micronutrients and mixtures thereof and is especially selected from among magnesium sulfate and hydrates thereof, inorganic compounds containing one or more micronutrients and mixtures thereof; and optionally
c) from 0 to 20% by weight, e.g. from 1 to 20% by weight or from 2 to 20% by weight or from 5 to 20% by weight, of sodium chloride;
where the abovementioned FIGURES in % by weight are based on the dry mass of the finely divided raw material and where the abovementioned constituents in total make up, in particular, at least 95% by weight, especially at least 99% by weight, of the dry mass of the finely divided raw material.

In a particular group of embodiments of the invention, the raw material contains at least one salt of a secondary nutrient which is, in particular, selected from among magnesium sulfate and hydrates thereof. All known hydrates are in principle possible as hydrates of magnesium sulfate. Examples are magnesium sulfate heptahydrate, magnesium sulfate pentahydrate, magnesium sulfate 5/4-hydrate, magnesium sulfate hexahydrate, magnesium sulfate monohydrate and the like. The hydrates can be used in the form of naturally occurring minerals such as epsomite, hexahydrite, pentahydrite, kieserite, or else in the form of synthetically produced hydrates. The magnesium sulfate is preferably used in the form of a monohydrate. The magnesium sulfate monohydrate can in principle be naturally occurring magnesium sulfate monohydrate, i.e. kiesertite, or a synthetically produced magnesium sulfate monohydrate, which will hereinafter also be referred to as synthetic magnesium sulfate hydrate or SMS for short and which generally also contains magnesium sulfate 5/4-hydrate. For the purposes of the present invention, a synthetic magnesium sulfate hydrate is a magnesium sulfate hydrate which is obtainable by reaction of caustic magnesium oxide with sulfuric acid, in particular with an aqueous sulfuric acid having a strength of from 50 to 90% by weight. Compared to magnesium sulfate monohydrate from natural sources such as kieserite, SMS generally contains smaller amounts of halides and a higher proportion of water-insoluble magnesium in the form of water-insoluble magnesium oxide. The digestion of magnesium oxide with aqueous sulfuric acid is known per se and is described, for example, in CN 101486596 or CN 101624299. The aqueous sulfuric acid used for the reaction usually has an $H_2SO_4$ concentration in the range from 50 to 90% by weight, in particular in the range from 55 to 85% by weight.

In a further particular group of embodiments of the invention, the raw material contains at least one inorganic compound containing one or more micronutrients, in particular at least one boron compound. In a further particular group of embodiments of the invention, the raw material contains at least one salt of a secondary nutrient which is, in particular, selected from among magnesium sulfate and hydrates thereof and at least one inorganic compound containing one or more micronutrients. In these particular groups of embodiments of the invention, the raw material typically contains a) from 60 to 99% by weight, in particular from 70 to 98% by weight, especially from 75 to 95% by weight, of potassium chloride and
b1) from 1 to 40% by weight, in particular in the range from 2 to 30% by weight, especially in the range from 5 to 25% by weight, of at least one salt of a secondary nutrient which is, in particular, selected from among magnesium sulfate and hydrates thereof, especially from among naturally occurring magnesium sulfate monohydrate, SMS and mixtures thereof;
where the abovementioned FIGURES in % by weight are based on the dry mass of the finely divided raw material and where the abovementioned constituents in total make up, in particular, at least 95% by weight, especially at least 99% by weight, of the dry mass of the finely divided raw material;

or a) from 55 to 98% by weight, in particular from 60 to 96% by weight, especially from 65 to 90% by weight, of potassium chloride and
b1) from 1 to 40% by weight, in particular in the range from 2 to 30% by weight, especially in the range from 5 to 25% by weight, of at least one salt of a secondary nutrient which is, in particular, selected from among magnesium sulfate and hydrates thereof, especially from among naturally occurring magnesium sulfate monohydrate, SMS and mixtures thereof;
c) from 1 to 20% by weight, in particular from 2 to 20% by weight and especially from 5 to 20% by weight, of sodium chloride;
where the abovementioned FIGURES in % by weight are based on the dry mass of the finely divided raw material and where the abovementioned constituents in total make up, in particular, at least 95% by weight, especially at least 99% by weight, of the dry mass of the finely divided raw material;

or a) from 90 to 99.9% by weight, in particular from 92 to 99.8% by weight, especially from 94 to 99.5% by weight, of potassium chloride and
b2) from 0.1 to 10% by weight, in particular from 0.2 to 8% by weight and especially from 0.5 to 6% by weight, of at least one inorganic compound containing one or more micronutrients, in particular at least one boron compound, for example calcium sodium borate, e.g. in the form of ulexite, calcium borate, e.g. in the form of colemanite, sodium borate, e.g. sodium tetraborate, potassium borate or boric acid;
where the abovementioned FIGURES in % by weight are based on the dry mass of the finely divided raw material and where the abovementioned constituents in total make up, in particular, at least 95% by weight, especially at least 99% by weight, of the dry mass of the finely divided raw material;

or a) from 59 to 98.9% by weight, in particular from 69 to 97.8% by weight, especially from 74 to 94.5% by weight, of potassium chloride,
b1) from 1 to 40% by weight, in particular in the range from 2 to 30% by weight, especially in the range from 5 to 25% by weight, of at least one salt of a secondary nutrient selected, in particular, from among magnesium sulfate and hydrates thereof, especially from among naturally occurring magnesium sulfate monohydrate, SMS and mixtures thereof; and
b2) from 0.1 to 10% by weight, in particular from 0.2 to 8% by weight and especially from 0.5 to 6% by weight, of at least one inorganic compound containing one or more micronutrients, in particular at least one boron compound, for example calcium sodium borate, e.g. in the form of ulexite, calcium borate, e.g. in the form of colemanite, sodium borate, e.g. sodium tetraborate, potassium borate or boric acid;

where the abovementioned FIGURES in % by weight are based on the dry mass of the finely divided raw material and where the abovementioned constituents in total make up, in particular, at least 95% by weight, especially at least 99% by weight, of the dry mass of the finely divided raw material;

or a) from 55 to 97.9% by weight, in particular from 60 to 95.8% by weight, especially from 65 to 89.5% by weight, of potassium chloride and b1) from 1 to 40% by weight, in particular in the range from 2 to 30% by weight, especially in the range from 5 to 25% by weight, of at least one salt of a secondary nutrient selected, in particular, from among magnesium sulfate and hydrates thereof, especially from among naturally occurring magnesium sulfate monohydrate, SMS and mixtures thereof;

b2) from 0.1 to 10% by weight, in particular from 0.2 to 8% by weight and especially from 0.5 to 6% by weight, of at least one inorganic compound containing one or more micronutrients, in particular at least one boron compound, for example calcium sodium borate, e.g. in the form of ulexite, calcium borate, e.g. in the form of colemanite, sodium borate, e.g. sodium tetraborate, potassium borate or boric acid;

c) from 1 to 20% by weight, in particular from 2 to 20% by weight and especially from 5 to 20% by weight, of sodium chloride;

where the abovementioned FIGURES in % by weight are based on the dry mass of the finely divided raw material and where the abovementioned constituents in total make up, in particular, at least 95% by weight, especially at least 99% by weight, of the dry mass of the finely divided raw material.

In the process of the invention, further potassium chloride-containing material can be additionally also mixed into the raw material. Such further material is, for example, a recycle material which is obtained in the classification of the potash granules of the invention and can optionally be communited beforehand. In these mixtures of fine salt and further potassium chloride, the proportion of further potassium chloride, e.g. the recycle material, will generally be in the range from 1 to 70% by weight, based on the total mass of the raw material supplied to compaction.

In step a), the finely divided raw material is mixed with the sulfur melt. For this purpose, a sulfur melt is typically provided by heating the sulfur to a temperature above the melting point of sulfur, e.g. a temperature in the range from 115 to 150° C. The sulfur melt is then mixed in a manner known per se with the potassium chloride-containing finely divided raw material in an apparatus suitable for this purpose. Suitable apparatuses for mixing the finely divided raw material with the sulfur melt are gravity mixers with and without internals, e.g. drum mixers and ring mixers, paddle mixers such as trough mixers, plowshare mixers, double-shaft mixers and intensive mixers and also screw mixers.

Mixing will preferably be carried out in such a way that a temperature of the mixture being formed of at least 80° C., in particular at least 100° C. and especially at least 110° C. or at least 115° C., is maintained during mixing. Mixing will preferably be carried out so that a temperature of the mixture being formed of 150° C., in particular 140° C., is not exceeded during mixing. In particular, mixing will be carried out so that the temperature of the mixture being formed is at least 115° C. and in particular does not exceed 150° C., at least at the commencement of mixing.

In order to achieve uniform distribution of the sulfur in the raw material, the sulfur melt will be mixed into the moving, finely divided raw material in a mixing apparatus, in particular in an intensive mixer. For this purpose, finely divided raw material is generally placed in the mixing apparatus, in particular the intensive mixer, and the sulfur melt is mixed into the moving finely divided raw material for this purpose. In order to ensure the desired temperature during mixing, heatable mixing apparatuses can be used or the finely divided raw material can be preheated to a temperature which corresponds to the desired mixing temperature or does not deviate significantly, preferably by not more than 40° C., from this temperature.

The preferably still hot mixture of sulfur and the potassium chloride-containing finely divided raw material will subsequently be processed in a manner known per se by compacting to give the sulfur-containing potash granules. For the purposes of the invention, the term compacting encompasses the production of granules with exertion of pressure onto the mixture of sulfur and the potassium chloride-containing, finely divided raw material and thus both the pressing described in more detail below and briquetting.

It has been found to be advantageous here for the temperature of the mixture which is fed to compacting to be at least 80° C. and in particular at least 90° C. Furthermore, it has been found to be advantageous for the mixture which is fed to compacting to have a temperature which does not exceed 120° C., in particular a temperature which does not exceed 110° C. In particular, it has been found to be advantageous for the mixture to have a temperature in the range from 70 to 120° C. and in particular in the range from 80 to 110° C. during compacting. This gives granules in which the sulfur is particularly uniformly distributed. Adhering to the upper temperature limit indicated here ensures, in particular, that deposition of sulfur on the surface of the granule particles is minimized.

The actual compaction can be carried out by a method analogous to the agglomeration processes known from the prior art, in which the preferably still hot mixture of sulfur and finely divided raw material is compacted with application of pressing pressure. Such processes are described, for example, in Wolfgang Pietsch, Agglomeration Processes, Wiley-VCH, 1$^{st}$ edition, 2002, in G. Heinze, Handbuch der Agglomerationstechnik, Wiley-VCH, 2000, and in Perry's Chemical Engineers' Handbook, 7$^{th}$ edition, McGraw-Hill, 1997. Here and in the following, these processes will also be referred to as press agglomeration or press granulation, with these terms being used synonymously.

During compaction, the preferably still hot mixture of sulfur and finely divided raw material is compacted with application of pressure. Depending on the type of compaction, the finely divided constituents of the mixture are agglomerated to form coarse agglomerates or strip-like strands. Depending on the type of press agglomeration, communition of the coarse material obtained by compaction, or individualization, is then optionally carried out. All presses known for similar purposes, for example, punch presses, continuous extruders, hole presses and roller presses, are in principle suitable for compaction.

Compaction is preferably carried out using a roller press. In roller presses, compaction occurs in the gap between two contrarotating rollers. The roller surfaces can be smooth, profiled, e.g. fluted, rippled or ribbed, or be provided with molding depressions. Any profiling of the roller surface serves first and foremost for improving the intake behavior into the roller gap.

In a preferred embodiment of the invention, compaction is effected by means of a roller press whose rollers are equipped with molding depressions. Such rollers are also referred to as molding rollers. Typical molding depressions have hemispherical, hemiellipsoidal, hemicylindrical or half-cushion-shaped geometries. The dimensions of the molding depressions are selected so that two molding depressions correspond approximately to the desired dimensions of the granules to be produced. The molding depressions preferably have a depth of from about 1 to 4 mm. The radius or the axis length of the circular or elliptical intersection of the spherical or hemiellipsoidal molding depressions with the roller surface is typically in the range from 2 to 10 mm, in particular from 3 to 8 mm. The same applies to the edge lengths of the intersections of the hemicylindrical, half-cushion-shaped molding depressions with the roller surface. The pressing forces which are required for compaction and are usually based on the roller width and reported as line forces are generally in the range from 1 to 50 kN/cm, in particular in the range from 4 to 40 kN/cm, and based on a diameter of 1000 mm. The roller press is generally operated at a roller circumferential speed in the range from 0.05 to 1.6 m/s.

This gives a strip of preshaped granules which are joined to one another by thin webs. The granules which have been preshaped in this way can be individualized by action of mechanical forces and smoothed at the fracture surfaces, which is also referred to as mechanical rounding, rounding-out or making round. This is typically carried out in an apparatus suitable for rounding of granules, for example a spheronizer or a drum screen. This gives a uniformly shaped granular material having dimensions and shapes prescribed by the molding depressions. Examples of such shapes are spheres, ellipsoids, rods and cushion shapes, which in the following are also referred to as mini briquettes. In general, 90% of the granules obtained in this way have a particle size in the range from 2 to 10 mm, in particular from 3 to 8 mm, determined by sieve analysis in accordance with DIN 6165:2016-08.

During individualization and rounding, not only the granules but also a dust whose chemical composition corresponds to the mixture of raw material and sulfur are naturally obtained. This dust can be partly or entirely recirculated to the raw material or to the mixture of finely divided raw material and molten sulfur, preferably to the raw material before mixing with the sulfur melt. It can be advantageous here to heat the dust, e.g. to a temperature in the range from 80 to 130° C., before mixing with the raw material.

In another preferred embodiment of the invention, compaction is carried out by means of a roller press whose rollers have a smooth or profiled roller surface. In this case, the primary agglomeration product is a tape-like or plate-like strand, also referred to as ribbon, exiting from the roller gap. The pressing forces which are required for compaction and are usually based on the roller width and reported as line forces are generally in the range from 2 to 75 kN/cm, in particular in the range from 4 to 70 kN/cm, and based on a diameter of 1000 mm and an average ribbon thickness of 10 mm. In general, the roller press is operated at a roller circumferential speed in the range from 0.05 to 1.6 m/s. This generally gives ribbons which are subjected to communition to set the particle size. The communition of the ribbons can be carried out in a manner known per se, for example by milling in apparatuses suitable for this purpose, for example in impact crushers, impact mills or roller crushers.

The communited ribbons are generally subjected to classification. Here, the material is separated into granule particles, i.e. granules having the in-specification particle size, known as good material, finer granules and dust (fines or undersize) and optionally coarser granules (coarse fraction or oversize). Potash granules which are in-specification are, in particular, granules in which at least 90% by weight of the granules have a particle size in the range from 2 to 8 mm and in particular in the range from 3 to 6 mm, determined by sieve analysis in accordance with DIN 6165:2016-08. Classification can be carried out by conventional methods, in particular by sieving.

The out-of-specification granulated material obtained in the classification, known as the recycle material, is generally returned to the process, i.e. added to the finely divided raw material or to the mixture of finely divided raw material and molten sulfur. It can be advantageous here for the recycle material to be heated, e.g. to a temperature in the range from 80 to 130° C., before mixing with the raw material. The undersize can be recirculated directly as recycle material to the process. The oversize is generally partly or completely milled and then, optionally after further classification, the finely divided constituents are recirculated to the process. The partial milling of the oversize can be followed by further classification in which further good material can be obtained.

It has been found to be advantageous for the strength of the potash granules for the freshly produced granules to be treated with water, i.e. moistened, and optionally dried again after compaction. This procedure is also referred to as glazing. The treatment with water can occur directly after compaction of the mixture of raw material and sulfur. However, it is generally carried out after the rounding or communition of the ribbons.

The amount of water used for treating the potash granules is generally in the range from 1 to 50 g/kg, in particular in the range from 1 to 20 g/kg, based on the weight of the freshly produced potassium chloride granules.

The temperature of the granules on moistening is not critical. It can be in the region of room temperature, e.g. in the range from 18 to 30° C., or above, e.g. up to 130° C., or below, e.g. at least 5° C. In general, the granules will have a temperature in the range from 10 to 100° C. immediately before moistening.

The moistened granules can be dried after moistening. Drying is preferably carried out by means of a stream of air. The temperature of the stream of air is preferably selected so that the temperature of the granules does not exceed a temperature of 130° C., in particular 120° C., during drying. The stream of air preferably has a temperature in the range from 60 to 140° C. For example, the moistened granules can be dried in a moving or fluidized bed, with the moving or fluidized bed being generated by the stream of air being passed through the moistened granulated material. Drying can also be carried out in drying drums. The water is usually discharged as vapor.

Furthermore, compaction can be followed by heat treatment of the potash granules obtainable according to the invention. The heat treatment can be carried out at a temperature in the range from 80 to <130° C., in particular from 90 to 120° C. The heat treatment can be carried out instead of glazing and before or after glazing. It is generally carried out after individualization or communition of the ribbon.

The invention also provides the potash granules obtainable by the process of the invention.

According to the invention, the granules contain elemental sulfur in addition to potassium chloride. The composition of the granules naturally corresponds essentially to the composition of the mixture of raw material and sulfur and can therefore be set in the desired way via the composition of the raw material and the amount of sulfur melt.

The granules of the invention generally contain the elemental sulfur in an amount of from 2 to 29% by weight, in particular from 3 to 24% by weight, preferably from 4 to 22% by weight and especially from 7 to 19% by weight, based on the total weight of the constituents other than water in the potash granules.

The sulfur is present in finely divided form in the potash granules according to the invention. The sulfur is typically present in the form of finely divided particles which can optionally be loosely agglomerated. The particle size of the sulfur particles in the granules can be determined by dissolution of the granules in deionized water by means of laser light scattering in accordance with ISO 13320:2009-10. The average particle size of the sulfur particles (weight average, D50) is typically in the range from 20 to 150 μm. The D90 of the particle size distribution of the sulfur particles is typically below 250 μm, in particular not more than 200 μm, e.g. in the range from 40 to 200 μm. The D10 of the particle size distribution of the sulfur particles is typically below 25 μm, e.g. in the range from 1 to 25 μm.

The content of potassium chloride is typically in the range from 54 to 98% by weight, frequently in the range from 58 to 97% by weight, in particular in the range from 62 to 96% by weight and especially in the range from 63 to 93% by weight, based on the total weight of the constituents other than water in the potash granules. In general, the granules have a potassium content, calculated as $K_2O$, in the range from 34.0% by weight to 61.7% by weight, in particular in the range from 36.5 to 61.0% by weight, particularly preferably in the range from 39.1 to 60.5% by weight and especially in the range from 39.7 to 58.6% by weight, based on the total weight of the constituents other than water in the potash granules or based on the dry mass thereof.

The content of further constituents will typically not exceed 44% by weight, frequently 39% by weight, in particular 34% by weight and especially 30% by weight, based on the dry mass of the potash granules.

If the granules contain at least one salt of a secondary nutrient which is, in particular, selected from among magnesium sulfate and hydrates thereof, especially from among naturally occurring magnesium sulfate monohydrate, SMS and mixtures thereof, the proportion thereof is preferably in the range from 1 to 39% by weight, in particular in the range from 2 to 28% by weight, especially in the range from 4 to 23% by weight, based on the dry mass of the potash granules.

A preferred embodiment 1 of the invention relates to potash granules which are obtainable according to the invention and consist essentially of a) from 71 to 98% by weight, in particular from 76 to 97% by weight and especially from 78 to 96% by weight or from 81 to 93% by weight, of potassium chloride and
d) from 2 to 29% by weight, in particular from 3 to 24% by weight, preferably from 4 to 22% by weight and especially from 7 to 19% by weight, of elemental sulfur;

where the abovementioned FIGURES in % by weight are based on the dry mass of the granules and where the abovementioned constituents in total make up, in particular, at least 95% by weight, especially at least 99% by weight, of the dry mass of the granules.

A further preferred embodiment 2 of the invention relates to potash granules which are obtainable according to the invention and consist essentially of a) from 58 to 97% by weight, in particular from 65 to 95% by weight and especially from 68 to 92% by weight or from 70 to 89% by weight, of potassium chloride,
b1) from 1 to 39% by weight, in particular in the range from 2 to 28% by weight, especially in the range from 4 to 23% by weight, of at least one salt of a secondary nutrient selected, in particular, from among magnesium sulfate and hydrates thereof, especially from among naturally occurring magnesium sulfate monohydrate, SMS and mixtures thereof, and
d) from 2 to 29% by weight, in particular from 3 to 24% by weight, preferably from 4 to 22% by weight and especially from 7 to 19% by weight, of elemental sulfur;

where the abovementioned FIGURES in % by weight are based on the dry mass of the granules and where the abovementioned constituents in total make up, in particular, at least 95% by weight, especially at least 99% by weight, of the dry mass of the granules.

A further preferred embodiment 3 of the invention relates to potash granules which are obtainable according to the invention and consist essentially of a) from 54 to 96% by weight, in particular from 58 to 93% by weight and especially from 62 to 88% by weight or from 63 to 85% by weight, of potassium chloride,
b1) from 1 to 39% by weight, in particular in the range from 2 to 28% by weight, especially in the range from 4 to 22% by weight, of at least one salt of a secondary nutrient which is, in particular, selected from among magnesium sulfate and hydrates thereof, especially from among naturally occurring magnesium sulfate monohydrate, SMS and mixtures thereof,
c) from 1 to 20% by weight, in particular from 2 to 19% by weight and especially from 4 to 18% by weight, of sodium chloride and
d) from 2 to 29% by weight, in particular from 3 to 24% by weight, preferably from 4 to 22% by weight and especially from 7 to 19% by weight, of elemental sulfur;

where the abovementioned FIGURES in % by weight are based on the dry mass of the granules and where the abovementioned constituents in total make up, in particular, at least 95% by weight, especially at least 99% by weight, of the dry mass of the granules.

A further preferred embodiment 4 of the invention relates to potash granules which are obtainable according to the invention and consist essentially of a) from 65 to 97.9% by weight, in particular from 70 to 96.8% by weight and especially from 75 to 95.5 or from 78 to 92.5% by weight, of potassium chloride;
b2) from 0.1 to 10% by weight, in particular from 0.2 to 8% by weight and especially from 0.5 to 6% by weight, of at least one inorganic compound containing one or more micronutrients, in particular at least one boron compound, for example calcium sodium borate, e.g. in the form of ulexite, calcium borate, e.g. in the form of colemanite, sodium borate, e.g. sodium tetraborate, potassium borate or boric acid; and
d) from 2 to 29% by weight, in particular from 3 to 24% by weight, preferably from 4 to 22% by weight and especially from 7 to 19% by weight, of elemental sulfur;

where the abovementioned FIGURES in % by weight are based on the dry mass of the granules and where the abovementioned constituents in total make up, in particular, at least 95% by weight, especially at least 99% by weight, of the dry mass of the granules.

A further preferred embodiment 5 of the invention relates to potash granules which are obtainable according to the invention and consist essentially of a) from 57 to 96.9% by weight, in particular from 65 to 94.8% by weight and especially from 70 to 89.5% by weight or from 72 to 86.5% by weight, of potassium chloride, b1) from 1 to 39% by weight, in particular in the range from 2 to 30% by weight, especially in the range from 5 to 25% by weight, of at least one salt of a secondary nutrient which is selected, in particular, from among magnesium sulfate and hydrates thereof, especially from among naturally occurring magnesium sulfate monohydrate, SMS and mixtures thereof; and b2) from 0.1 to 10% by weight, in particular from 0.2 to 8% by weight and especially from 0.5 to 6% by weight, of at least one inorganic compound containing one or more micronutrients, in particular at least one boron compound, for example calcium sodium borate, e.g. in the form of ulexite, calcium borate, e.g. in the form of colemanite, sodium borate, e.g. sodium tetraborate, potassium borate or boric acid;

where the abovementioned FIGURES in % by weight are based on the dry mass of the finely divided raw material and where the abovementioned constituents in total make up, in particular, at least 95% by weight, especially at least 99% by weight, of the dry mass of the finely divided raw material;

d) from 2 to 29% by weight, in particular from 3 to 24% by weight, preferably from 4 to 22% by weight and especially from 7 to 19% by weight, of elemental sulfur;

where the abovementioned FIGURES in % by weight are based on the dry mass of the granules and where the abovementioned constituents in total make up, in particular, at least 95% by weight, especially at least 99% by weight, of the dry mass of the granules.

A further preferred embodiment 6 of the invention relates to potash granules which are obtainable according to the invention and consist essentially of a) from 54 to 95.9% by weight, in particular from 58 to 92.8% by weight and especially from 62 to 87.5% by weight or from 63 to 84.5% by weight, of potassium chloride, b1) from 1 to 39% by weight, in particular in the range from 2 to 29% by weight, especially in the range from 4 to 23% by weight, of at least one salt of a secondary nutrient which is selected, in particular, from among magnesium sulfate and hydrates thereof, especially from among naturally occurring magnesium sulfate monohydrate, SMS and mixtures thereof, b2) from 0.1 to 10% by weight, in particular from 0.2 to 8% by weight and especially from 0.5 to 6% by weight, of at least one inorganic compound containing one or more micronutrients, in particular at least one boron compound, for example calcium sodium borate, e.g. in the form of ulexite, calcium borate, e.g. in the form of colemanite, sodium borate, e.g. sodium tetraborate, potassium borate or boric acid, and c) from 1 to 20% by weight, in particular from 2 to 19% by weight and especially from 4 to 18% by weight, of sodium chloride, d) from 2 to 29% by weight, in particular from 3 to 24% by weight, preferably from 4 to 22% by weight and especially from 7 to 19% by weight, of elemental sulfur;

where the abovementioned FIGURES in % by weight are based on the dry mass of the granules and where the abovementioned constituents in total make up, in particular, at least 95% by weight, especially at least 99% by weight, of the dry mass of the granules.

A specific embodiment of granules according to the invention contains a') potassium in the form of potassium chloride, b1') magnesium in the form of magnesium sulfate or one of the hydrates thereof, in particular in the form of magnesium sulfate monohydrate, b2') optionally boron in the form of boric acid or a salt of boric acid, c) optionally sodium in the form of sodium chloride and d) elemental sulfur.

Such potash granules generally contain a') potassium in the form of potassium chloride in an amount of from 34.0 to 61.0% by weight, in particular in an amount of from 36.5 to 60.6% by weight and especially in an amount of from 39.1 to 60.5% by weight or in an amount of from 40.0 to 58.6% by weight, calculated as $K_2O$ and based on the dry mass of the granules;

b1') magnesium in the form of magnesium sulfate in an amount of from 0.3 to 13.0% by weight, in particular in an amount of from 0.65 to 9.7% by weight, especially in an amount of from 1.3 to 7.7% by weight, calculated as MgO and based on the dry mass of the granules;

b2') optionally boron in the form of boric acid or a salt of boric acid, e.g. in an amount of from 0.05 to 7.0% by weight, in particular in an amount of from 0.1 to 5.6% by weight and especially in an amount of from 0.15 to 5% by weight, of boron, calculated as $B_2O_3$ and based on the dry mass of the granules, c) optionally sodium in the form of sodium chloride, e.g. in an amount of from 0.5 to 10.6% by weight, from 1.1 to 10.0% by weight and especially in an amount of from 2.1 to 9.5% by weight, calculated as $Na_2O$ and based on the dry mass of the granules;

and d) from 2 to 29% by weight, in particular from 3 to 24% by weight, preferably from 4 to 22% by weight and especially from 7 to 19% by weight, of elemental sulfur, based on the dry mass of the granules.

The potash granules obtainable by the process of the invention generally have a particle size or a particle diameter in the range from 2 to 10 mm and in particular in the range from 2.5 to 8 mm in at least 90% by weight of the granules, determined by sieve analysis in accordance with DIN 6165:2016-08. The weight average particle size of the granules is typically in the range from 3 to 8 mm, in particular in the range from 3.5 to 7 mm, determined by sieve analysis in accordance with DIN 6165:2016-08. The weight average particle size is the particle size of the particle size range above and below which 50% by weight of the granules lie.

It has been found to be advantageous for the strength of the potash granules of the invention for the potash granules to have been produced by compaction by means of a roller press, the rollers of which are equipped with molding depressions. These granules are also referred to as mini briquettes. Potash granules according to the invention in the form of mini briquettes display a very uniform, in particular monomodal, particle size distribution. The distribution width of the particle size range is comparatively narrow—the uniformity index Q of the particle size range of the mini briquettes, i.e. the ratio of the formula (1):

$$Q=(D90-D10)/D50 \quad (1)$$

is typically in the range below 1 for crushed granular material and below 0.5 for mini briquettes. In formula (1), the variables D10, D50 and D90 have the following meaning: D50 is the weight average particle size, i.e. the particle size below which 50% by weight of the granules lie;

D10 is the particle size below which 10% by weight of the granules lie;

D90 is the particle size below which 90% by weight of the granules lie.

The values of D10, D50 and D90 can be derived directly from the particle size distribution determined by sieve analysis in accordance with DIN 6165:2016-08.

The following examples serve to illustrate the invention.

Abbreviations

FS: fracture strength/rupture strength
Ex.: Example
n.d.: not determined
D: day
S (liq.): sulfur melt
S (m): milled/micronized sulfur (ground sulfur)

Use Testing of the Granules:

1) Particle Size Determination:

The determination of the particle size distribution of the granules according to the invention was carried out by means of sieve analysis using a method based on DIN 6165:2016-08 on an analytical vibratory sieving machine (Retsch AS 200 control).

2) Rupture Strength/Fracture Strength:

The rupture strength or fracture strength of the granules of the invention was determined using the tablet fracture strength tester TBH 425D from ERWEKA on the basis of measurements on 56 individual granules of different particle sizes (fraction 2.5-3.15 mm for crushed granular material and fraction 4.5-5.6 mm for mini briquettes) and the average was calculated. The force necessary for crushing the granule between punch and plate of the fracture strength tester was determined. Granules having a rupture strength of >400 N and those having a fracture strength of <4 N were disregarded in calculation of the average.

3) Storage Stability on Moist Weathering:

To determine the storage stability, the rupture strength of the granules was determined after storage under difficult climatic conditions. For this purpose, the granules were stored for 24 hours at 20° C. and 72% relative atmospheric humidity in a controlled temperature/humidity cabinet. The rupture strength was subsequently determined in the manner described under point 2). Here, the rupture strength was averaged over the totality of measured granules (56 granules) in order to be able to make a definitive statement in respect of a decrease in quality.

4) Abrasion:

The values for abrasion were determined using the rolling drum method of Busch. For this purpose, 50 g of granules of a particle size fraction of 2.5-3.15 mm for crushed granular material or 4.5-5.6 mm for mini briquettes were placed together with 70 steel balls (diameter 10 mm, 283 g) in a rolling drum of a commercial abrasion tester, e.g. ERWEKA, model TAR 20, and the drum was rotated at 40 rpm for 10 minutes. The contents of the drum were subsequently sieved on a sieve having a mesh opening of 5.6 mm, under which a sieve having a mesh opening of 0.5 mm was arranged, for 1 minute on a sieving machine (Retsch AS 200 control). The fines sieved off corresponded to the abrasion.

5) Yield 5.1) Crushed Granular Material:

To determine the yield of crushed granular material, all of the coarse fraction obtained on classification was classified again and the product fraction was separated off. This operation was continued until no coarse fraction was obtained on classification. The product fractions were combined and the total mass of the combined product fractions was divided by the amount of raw material used.

5.2) Mini briquettes:

In the case of mini briquettes, the product fraction after rounding was merely weighed and divided by the amount used.

6) Determination of the Particle Size of the Sulfur in the Granules

In order to determine the particle size of the sulfur in the granules, from 20 g to 40 g of the granules, depending on the sulfur content, were added to 400 ml of water and allowed to stand for a number of days at 30° C. while swirling. A wet-dispersed particle measurement by means of laser light scattering was subsequently carried out using the S3500 from Microtrac. The results for selected examples are shown in table 3.

I. Starting Materials:

The following starting materials were used:

Potassium chloride 1 (KCl-1):

Potassium chloride (untreated) having the following specification:

KCl content of 96.8% by weight (=60.4% of $K_2O$).
Total content of Ca+Mg: 0.29% by weight
Loss on drying at 105° C.: <0.1% by weight.

The potassium chloride had the following particle size distribution:

$d_{10}$: 94.0 μm, $d_{50}$: 222.9 μm, $d_{90}$: 387.6 μm.

Potassium chloride 2 (KCl-2):

KCl content of 93.3% by weight (=58.9% of $K_2O$)
NaCl content of 1.5% by weight.

The particles of the potassium chloride 2 have particle sizes below 500 μm.

Kieserite:

Magnesium content: 15.7% by weight (=26% by weight of MgO)
Sulfate content: 53.7% by weight
Particle size distribution:
$d_{10}$: 2.5 μm, $d_{50}$: 28.6 μm, $d_{90}$: 68.0 μm.

SMS:

Magnesium content: 16.9% by weight (=28% by weight of MgO)
Sulfate content ($SO_3$): 52.6% by weight
Particle size distribution: 90%<0.25 mm with 50%<0.09 mm Sodium Tetraborate:

$B_2O_3$ content of 47.9% by weight of $B_2O_3$
NaCl content of 40.5% by weight

Particle Size Distribution:

$d_{10}$: 156.7 μm, $d_{50}$: 411.7 μm, $d_{90}$: 895.2 μm

Ulexite:

$B_2O_3$ content of 30.5% by weight as $B_2O_3$
NaCl content of 6.7% by weight
Particle size distribution: comparable to sodium tetraborate Colemanite:

$B_2O_3$ content of 40.2% by weight as $B_2O_3$

NaCl content<1% by weight

Particle size distribution: comparable to sodium tetraborate

Ground Sulfur:

Commercially available ground sulfur, for example the product "Schwefel gemahlen" from CS Additive GmbH:

Sulfur content: 99.99% by weight

Particle size distribution: $d_{10}$: 3.1 μm, $d_{50}$: 15.6 μm, $d_{90}$: 40.8 μm Sulfur Melt:

The commercial ground sulfur (sulfur content of 99.99% by weight) was melted in an oven at 135° C.

II. Production of the Granules:

a) Crushed Granular Material:

(1) About 3-5 kg of the finely divided potassium chloride which had been preheated to 135° C. or 3-5 kg of a preheated (135° C.) mixture of finely divided potassium chloride and further salts (magnesium sulfate, boron compound) were placed in a heatable Eirich intensive mixer (model R01) having a capacity of 8 kg. The sulfur component (ground sulfur or sulfur melt) was slowly added thereto over a period of 1 minute and the mixture was intensively mixed for 3 minutes, with the mixture having a temperature of about 90 to 110° C.

(2) The still hot mixture was subsequently introduced uniformly into a laboratory press and compacted. A laboratory press from Bepex, model L200/50, which had two contrarotating rollers (roller diameter 200 mm, working width 50 mm) was used for this purpose. Rollers having rod-shaped depressions (length 46 mm×width 21 mm×depth 2 mm) were used. The laboratory press was operated at a speed of rotation of the rollers of 6.2 rpm. The specific pressing force was set individually in each experiment, with attention being paid to obtaining a uniform ribbon of flakes. The pressing force was about 60-120 kN in the case of mixtures containing ground sulfur and was 20-80 kN for mixtures containing a sulfur melt. The introduction of the mixture was carried out by means of a stuffing screw arranged above the pressing rollers. The rate of supply of mixture was about 0.5-2 kg/min.

(3) The flakes obtained here were subsequently comminuted in an impact mill from Hazemag. The impact mill had 2 impact devices and had a rotor diameter of 300 mm. The gap width of the front impact device was set to 10 mm and for the back impact device was set to 5 mm. The impact mill was operated at a circumferential speed of the rotor of 15 m/s. Communition was carried out immediately after production of the flakes. The throughput of flakes was from about 0.5 to 2 kg/s.

(4) The material was subsequently classified using a commercial sieving apparatus, and the fraction having a particle size of 2-5 mm (product) was separated off. The fraction having a particle size of <2 mm can be recirculated to supply (fines). The proportion having a particle size of >5 mm (coarse material) can be milled and likewise be recirculated. For determination of the fracture strength or rupture strength of the granules, a test fraction (test granules) having a particle size of 2.5-3.15 mm was sieved out.

b) Mini Briquettes:

The production of the mini briquettes was carried out in steps (1) and (2) according to the procedure indicated for production of the crushed granular material, with the following differences.

In step (2), rollers having molding depressions (length 6 mm×width 6 mm×depth 1.6 mm) were used.

Steps (3) and (4) were carried out as follows:

(3) The mini briquettes obtained in step (2) were subjected to grain separation and rounding of the individual grains in a Bexroller BR 450 spheronizer from Hosokawa Alpine for 60 seconds at 500 rpm.

(4) The material obtained in step (3) was subsequently sieved off. Sieving-off was carried out in a particle size region of 4.5-5.6 mm, which represents the product fraction. The fraction having a particle size of <4.5 mm can be recirculated to introduction into step (2) (fines). The proportion having a particle size of >5.6 mm (coarse material) can be passed through the spheronizer again.

The amounts used, experimental parameters and yields are reported in table 1. The rupture strengths before and after weathering and also the values for abrasion are reported in table 2:

TABLE 1

Experiments on production of the granules using a sulfur melt or ground sulfur (comparison)

| Ex. | Composition | Compaction | Pressing force [kN] | Yield [%] |
|---|---|---|---|---|
| C0a | 100% KCl-1 | Crushed granular material | 100-120 | n.d. |
| C0b | 100% KCl-1 | Crushed granular material | 80-100 | 30 |
| C0c | 100% KCl-1 | Crushed granular material | 60 | 19% |
| C0d | 100% KCl-1 | Crushed granular material | 40-45 | 9% |
| C0e | 100% KCl-1 | Crushed granular material | 20-30 | No granular material obtained |
| C0f | 100% KC1-2 | Crushed granular material | n.b. | 26 |
| 1a | 85% KCl-1, 15% S (liq.) | Crushed granular material | 80-100 | 40 |
| 1b | 85% KCl-1, 15% S (liq. ) | Crushed granular material | 20-30 | 34 |
| 1c | 85% KCl-1, 15% S (liq.) | Crushed granular material | 60 | n.d. |
| C1 | 85% KCl-1, 15% S (m) | Crushed granular material | n.d. | 26 |
| C1b | 85% KCl-1, 15% S (m) | Crushed granular material | 20-30 | No granular material obtained |
| 2 | 80% KCl-1, 20% S (liq.) | Crushed granular material | n.d. | n.d. |
| 3 | 80% KCl-1, 20% S (liq.) | Mini briquettes | 20-30 | 59 |
| C3 | 80% KCl-1, 20% S (m) | Mini briquettes | n.d. | 21 |
| 4 | 85% KCl-1, 15% S (liq.) | Mini briquettes | n.d. | 60 |
| C4 | 85% KCl-1, 15% S (m) | Mini briquettes | n.d. | 19 |
| 5 | 88% KCl-1, 12% S (liq.) | Mini briquettes | 50-70 | 60 |
| C5 | 88% KCl-1, 12% S (m) | Mini briquettes | n.d. | 28 |
| 6 | 92% KCl-1, 8% S (liq.) | Mini briquettes | 70-80 | 57 |

TABLE 1-continued

| Experiments on production of the granules using a sulfur melt or ground sulfur (comparison) | | | | |
|---|---|---|---|---|
| Ex. | Composition | Compaction | Pressing force [kN] | Yield [%] |
| C6 | 92% KCl-1, 8% S (m) | Mini briquettes | n.d. | 30 |
| 7 | 95% KCl-1, 5% S (liq. ) | Mini briquettes | n.d. | 56 |
| C7 | 95% KCl-1, 5% S (m) | Mini briquettes | n.d. | 37 |
| 8a | 69% KC1-2, 19% S (liq.), 12% Kieserite | Mini briquettes | 30-40 | n.d. |
| 8b | 69% KCl-1, 19% S (liq.), 12% Kieserite | Mini briquettes | 30-40 | 75 |
| C8 | 69% KCl-1, 19% S (m), 12% Kieserite | Mini briquettes | 80 | 37 |
| 9 | 69% KCl-1, 12% S (liq.), 19% Kieserite | Mini briquettes | 30-40 | 71 |
| C9 | 69% KCl-1, 12% S (m), 19% Kieserite | Mini briquettes | 80 | 47 |
| 10 | 67% KCl-1, 16.5% S (liq), 12.5% Kieserite, 4% sodium tetraborate | Mini briquettes | n.d. | 48 |
| C10 | 67% KCl-1, 16.5% S (m), 12.5% Kieserite, 4% sodium tetraborate | Mini briquettes | n.d. | 37 |
| 11 | 78.5% KCl-1, 5% S (liq.), 12.5% Kieserite, 4% sodium tetraborate | Mini briquettes | n.d. | 55 |
| C11 | 78.5% KCl-1, 5% S (m), 12.5% Kieserite, 4% sodium tetraborate | Mini briquettes | n.d. | 39 |
| 12 | 67% KCl-1, 16.5% S (liq.), 12.5% SMS, 4% sodium tetraborate | Mini briquettes | n.d. | 50 |
| C12 | 67% KCl-1, 16.5% S (m), 12.5% SMS, 4% sodium tetraborate | Mini briquettes | n.d. | 25 |
| 13a | 67% KCl-1, 16.5% S (liq.), 12.5% Kieserite, 1% sodium tetraborate, 3% Colemanite | Mini briquettes | n.d. | n.d. |
| 13b | 67% KCl-1, 16.5% S (liq.), 12.5% Kieserite, 1% sodium tetraborate, 3% Ulexite | Mini briquettes | 30-40 | 74 |
| C13 | 67% KCl-1, 16.5% S (m), 12.5% Kieserite, 1% sodium tetraborate, 3% Ulexite | Mini briquettes | 60 | 59 |

C = Comparative experiment;
S (liq.) = sulfur melt;
S (m) = ground sulfur

It can be seen from the data in table 1 that the yield of granules is significantly increased by use of a sulfur melt instead of milled sulfur.

TABLE 2

| Abrasion/rupture strength after 1, 7, 14 days and also weathered rupture strength | | | | | | | |
|---|---|---|---|---|---|---|---|
| | Abrasion [%] | | | Rupture strength [N] | | | Weathered |
| Ex. | 1 day | 7 days | 14 days | 1 day | 7 days | 14 days | rupture strength [N] |
| C0a | 11 | 8 | 9 | 36 | 42 | 50 | n.d. |
| C0b | 17 | 13 | 17 | 29 | 36 | 39 | n.d. |
| C0c | 54 | 47 | n.d. | 32 | 32 | n.d. | n.d. |
| C0d | 59 | 60 | n.d. | 23 | 27 | n.d. | n.d. |

TABLE 2-continued

| Abrasion/rupture strength after 1, 7, 14 days and also weathered rupture strength | | | | | | | |
|---|---|---|---|---|---|---|---|
| | Abrasion [%] | | | Rupture strength [N] | | | Weathered |
| Ex. | 1 day | 7 days | 14 days | 1 day | 7 days | 14 days | rupture strength [N] |
| C0f | 10 | 11 | 8 | 49 | 67 | 71 | n.d. |
| 1a | 17 | 18 | 16 | 32 | 29 | 32 | 16N (33 individual granules)* |
| 1b | 22 | 21 | 21 | 28 | 25 | 27 | n.d. |
| 1c | 20 | 18 | 17 | 26 | 30 | 27 | n.d. |
| C1 | 26 | 24 | 25 | 23 | 26 | 28 | 14N (31 individual granules)* |
| 2 | 16 | 16 | 15 | 44 | 34 | 36 | n.d. |
| 3 | 6 | 9 | 8 | 57 | 61 | 64 | 49 |
| C3 | 8 | 9 | 9 | 43 | 47 | 43 | 37 |
| 4 | 6 | 6 | 6 | 71 | 62 | 64 | 44 |
| C4 | 9 | 9 | 8 | 50 | 47 | 49 | 36 |
| 5 | 8 | 7 | 6 | 57 | 60 | 63 | 39 |
| C5 | 6 | 4 | 6 | 50 | 47 | 56 | 37 |
| 6 | 11 | 8 | 10 | 44 | 45 | 46 | 38 |
| C6 | 4 | 3 | 3 | 54 | 54 | 56 | 35 |
| 7 | 5 | 6 | 5 | 60 | 59 | 59 | 48 |
| C7 | 2 | 2 | 2 | 63 | 66 | 65 | 35 |
| 8a | 3 | 3 | 2 | 90 | 92 | 90 | n.d. |
| 8b | 5 | 5 | 6 | 93 | 91 | 90 | 75 |
| C8 | 3 | 2 | 2 | 66 | 69 | 72 | 37 |
| 9 | 3 | 6 | 5 | 91 | 88 | 90 | 71 |
| C9 | 3 | 4 | 3 | 62 | 71 | 80 | 47 |
| 10 | 3 | 3 | 4 | 96 | 82 | 84 | 48 |
| C10 | 3 | 2 | 2 | 70 | 72 | 78 | 37 |
| 11 | 1 | 1 | 2 | 96 | 96 | 114 | 71 |
| C11 | 4 | 1 | 1 | 88 | 98 | 90 | 65 |
| 12 | 3 | 3 | 2 | 91 | 81 | 91 | 62 |
| C12 | 6 | 5 | 4 | 61 | 59 | 65 | 40 |
| 13a | 5 | 4 | 3 | 90 | 96 | 92 | 58 |
| 13b | 2 | 3 | 2 | 92 | 96 | 103 | 57 |
| C13 | 3 | 1 | 2 | 81 | 79 | 71 | 56 |

*The average of the rupture strength after weathering was determined using only 31 or 33 granules instead of 56 granules.

The data in table 2 show that the rupture strengths of the granules according to the invention after weathering are significantly better than the rupture strengths of the granules produced using ground sulfur.

TABLE 3

| Particle size distribution of the sulfur in the granules | | | |
|---|---|---|---|
| Ex. | D10 [μm] | D50 [μm] | D90 [μm] |
| 7 | 7.68 | 25.48 | 50.07 |
| C7 | 11.22 | 27.23 | 49.59 |
| 4 | 15.44 | 58.66 | 166.1 |
| C4 | 21.69 | 58.85 | 123.8 |
| 12 | 13.92 | 48.35 | 118.9 |

III. After-Treatment of the Granules:

On a laboratory granulator plate, about 1 kg of the granules produced in II. were sprayed with water at room temperature (about 22° C.). The water was mains water having a hardness of 13.8 dH. The nozzle was set so that it produced a flat spray cone having an opening angle of 120°. The amount of water applied was set so that the amount applied was about 10 g/kg, based on the mass of the granules.

The rupture strengths before and after weathering and also the values for abrasion of the granules treated in this way are reported in table 4:

TABLE 4

| | Abrasion [%] | | | Rupture strength [N] | | | Weathered |
|---|---|---|---|---|---|---|---|
| Ex. | 1 day | 7 days | 14 days | 1 day | 7 days | 14 days | rupture strength [N] |
| 1a | 15 | 14 | 13 | 26 | 30 | 32 | n.d. |
| 1b | 14 | 11 | 11 | 31 | 26 | 28 | n.d. |
| 1c | 14 | 13 | 12 | 32 | 31 | 30 | n.d. |
| 3 | n.d. | 2 | 2 | n.d. | 60 | 62 | 57 |
| C3 | n.d. | 2 | 3 | n.d. | 55 | 52 | 40 |
| 4 | 2 | 2 | 3 | 62 | 72 | 61 | n.d. |
| 8a | 0 | 0 | 0 | 112 | 110 | 111 | n.d. |
| 11 | 0 | 1 | 1 | 113 | 111 | 113 | 60 |
| 13a | 2 | 2 | 1 | 104 | 103 | 86 | n.d. |

The invention claimed is:

1. A process for producing sulfur-containing potash granules, comprising a) mixing of a potassium chloride-containing, finely divided raw material with a sulfur melt in an amount of from 2 to 30% by weight, based on the total amount of molten sulfur and finely divided raw material, to give a mixture of finely divided raw material and molten sulfur and b) compaction of the mixture of finely divided raw material and molten sulfur obtained in step a);

wherein at least 90% by weight of the particles of the potassium chloride-containing, finely divided raw material used in step a) have a particle size of not more than 1500 μm, as determined by sieve analysis in accordance with DIN 6165:2016-08; and wherein the temperature of the mixture is maintained in the range of 70 to 120° C. during compaction.

2. The process as claimed in claim 1, wherein the finely divided raw material contains up to 50% by weight, based on the total weight of the finely divided raw material, of one or more inorganic compounds which are different from potassium chloride.

3. The process as claimed in claim 2, wherein the inorganic compounds which are different from potassium chloride are selected from among magnesium sulfate and hydrates thereof, sodium chloride and inorganic compounds containing one or more micronutrients.

4. The process as claimed in claim 1, wherein compaction is carried out by means of molding rollers.

5. The process as claimed in claim 4, wherein the sulfur-containing potash granules obtained in step b) are mechanically rounded.

6. The process as claimed in claim 1, wherein the mixing of the potassium chloride-containing, finely divided raw material with the sulfur melt is carried out in such a way that the mixture obtained has a temperature in the range from 80 to 150° C.

7. The process as claimed in claim 1, wherein the sulfur melt is mixed into the moving finely divided raw material in an intensive mixer.

8. The process as claimed in claim 1, wherein the finely divided raw material has a potassium content, calculated as $K_2O$, of at least 31.5% by weight.

9. The process as claimed in claim 1, wherein step b) comprises i) pressing by means of a roller press of the mixture of finely divided raw material and molten sulfur obtained in step a), ii) followed by communition of the flakes obtained and iii) classification of the potash granules obtained on communition.

10. The process as claimed in claim 1, wherein treatment of the freshly produced potash granules with water follows compaction.

11. The process as claimed in claim 1, wherein a heat treatment of the freshly produced potash granules at a temperature in the range from 80 to <130° C. follows compaction.

12. The process as claimed in claim 1, wherein at least 90% by weight of the particles of the potassium chloride-containing, finely divided raw material used in step a) have a particle size of not more than 1000 μm, as determined by sieve analysis in accordance with DIN 6165:2016-08.

13. The process as claimed in claim 1, wherein the mixing of the potassium chloride-containing, finely divided raw material with the sulfur melt is carried out in such a way that the mixture obtained has a temperature in the range of 80 to 150° C. and wherein the temperature of the mixture is maintained in the range of 70 to 120° C. during compaction.

14. Sulfur-containing potash granules obtained by a process as claimed in claim 1.

15. The potash granules as claimed in claim 14 having a weight average particle size, determined by sieve analysis in accordance with DIN 6165:2016-08, in the range from 3 to 10 mm.

16. The potash granules as claimed in claim 15, wherein the particle size distribution of the granules is essentially monomodal.

17. The potash granules as claimed in claim 14 containing elemental sulfur in an amount of from 2 to 29% by weight, based on the total weight of the constituents other than water in the potash granules.

18. The potash granules as claimed in claim 14 having a potassium content, calculated as $K_2O$, of from 34 to 61.7% by weight, based on the dry constituents of the potash granules.

19. The potash granules as claimed in claim 14 containing potassium in the form of potassium chloride, magnesium in the form of magnesium sulfate or one of the hydrates thereof, elemental sulfur and boron in the form of boric acid or a salt of boric acid.

20. Sulfur-containing potash granules obtained by a process as claimed in claim 9.

* * * * *